C. R. HARCUS.
MOTOR TRUCK AND CAR.
APPLICATION FILED DEC. 2, 1916.

1,285,143.

Patented Nov. 19, 1918
4 SHEETS—SHEET 1.

Inventor
Charles R. Harcus
By
Attorney

C. R. HARCUS.
MOTOR TRUCK AND CAR.
APPLICATION FILED DEC. 2, 1916.

1,285,143

Patented Nov. 19, 1918
4 SHEETS—SHEET 3.

Inventor
Charles R. Harcus
By
Attorney

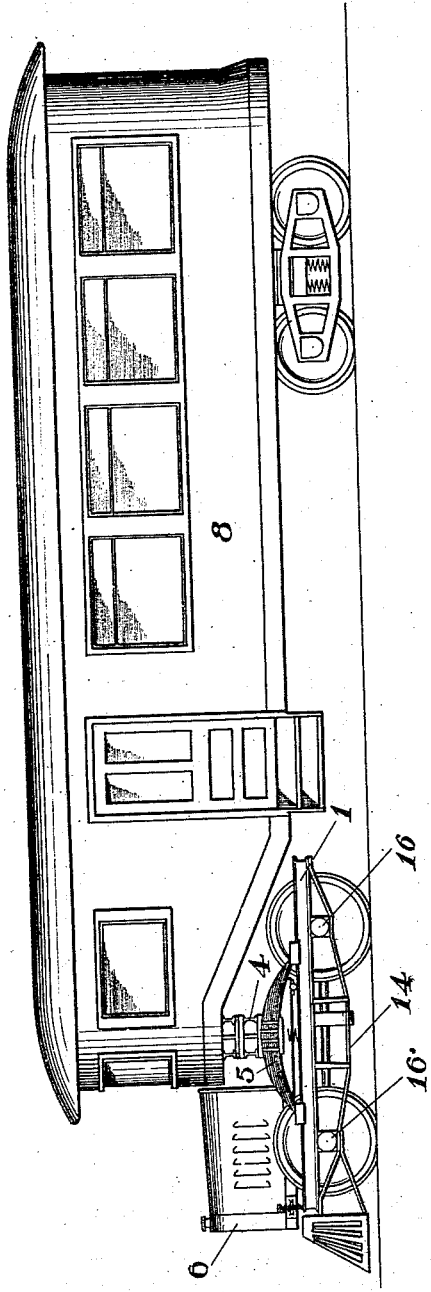

UNITED STATES PATENT OFFICE.

CHARLES R. HARCUS, OF EVERETT, WASHINGTON, ASSIGNOR OF ONE-HALF TO PERLEY E. SANDS, OF SEATTLE, WASHINGTON.

MOTOR TRUCK AND CAR.

1,285,143.

Specification of Letters Patent.  Patented Nov. 19, 1918.

Application filed December 2, 1916.  Serial No. 134,553.

*To all whom it may concern:*

Be it known that I, CHARLES R. HARCUS, a citizen of the United States, residing at Everett, in the county of Snohomish and State of Washington, have invented a new and useful Improvement in Motor Trucks and Cars, of which the following is a specification.

My invention relates to a motor truck and car and consists of a type of construction whereby a motor of the internal combustion type may be mounted upon a truck and this truck be combined with the car body so as to make a self-propelled car. It also consists of a truck which may be operated as a motor for hauling cars.

The object of my invention is to provide an improved type of truck which carries its own motor and which may be associated with cars for the purpose of producing an effective and desirable type of motor cars. The novel features of my invention will be hereinafter described and then particularly defined by the claims terminating this specification.

In the accompanying drawings I have shown my invention embodied in a truck having features of construction which I prefer to employ. It will, however, be evident that many of the details of construction herein shown and described may be modified without essentially altering the character of the invention.

Fig. 5 is a side view of a car having one end mounted upon the motor truck illustrated in the other figures.

Figure 1:
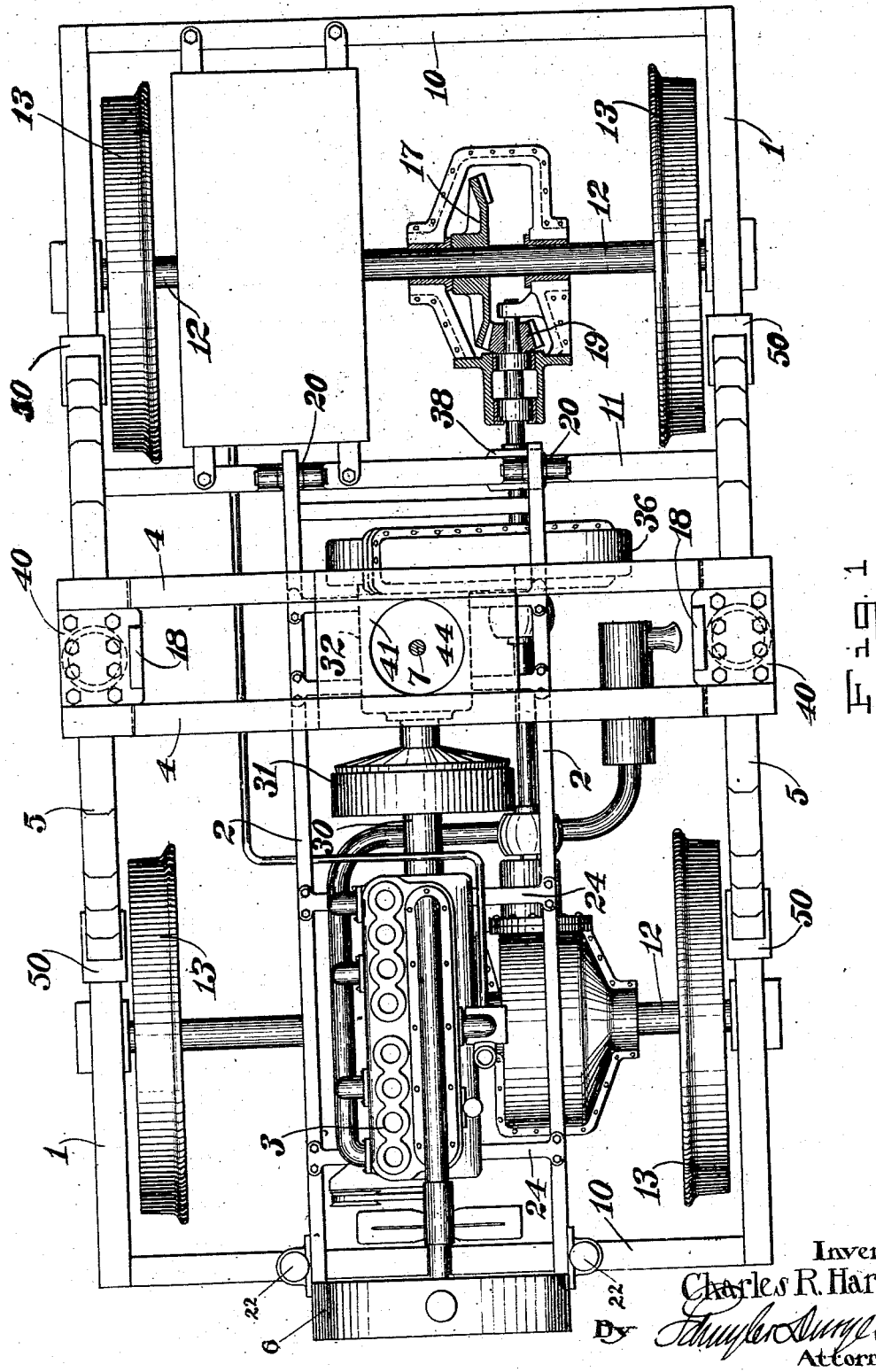
Figure 1 is a top or plan view of a truck having the motor and driving connections employed, with all covers and non-essential features of this kind removed.
Figure 2:
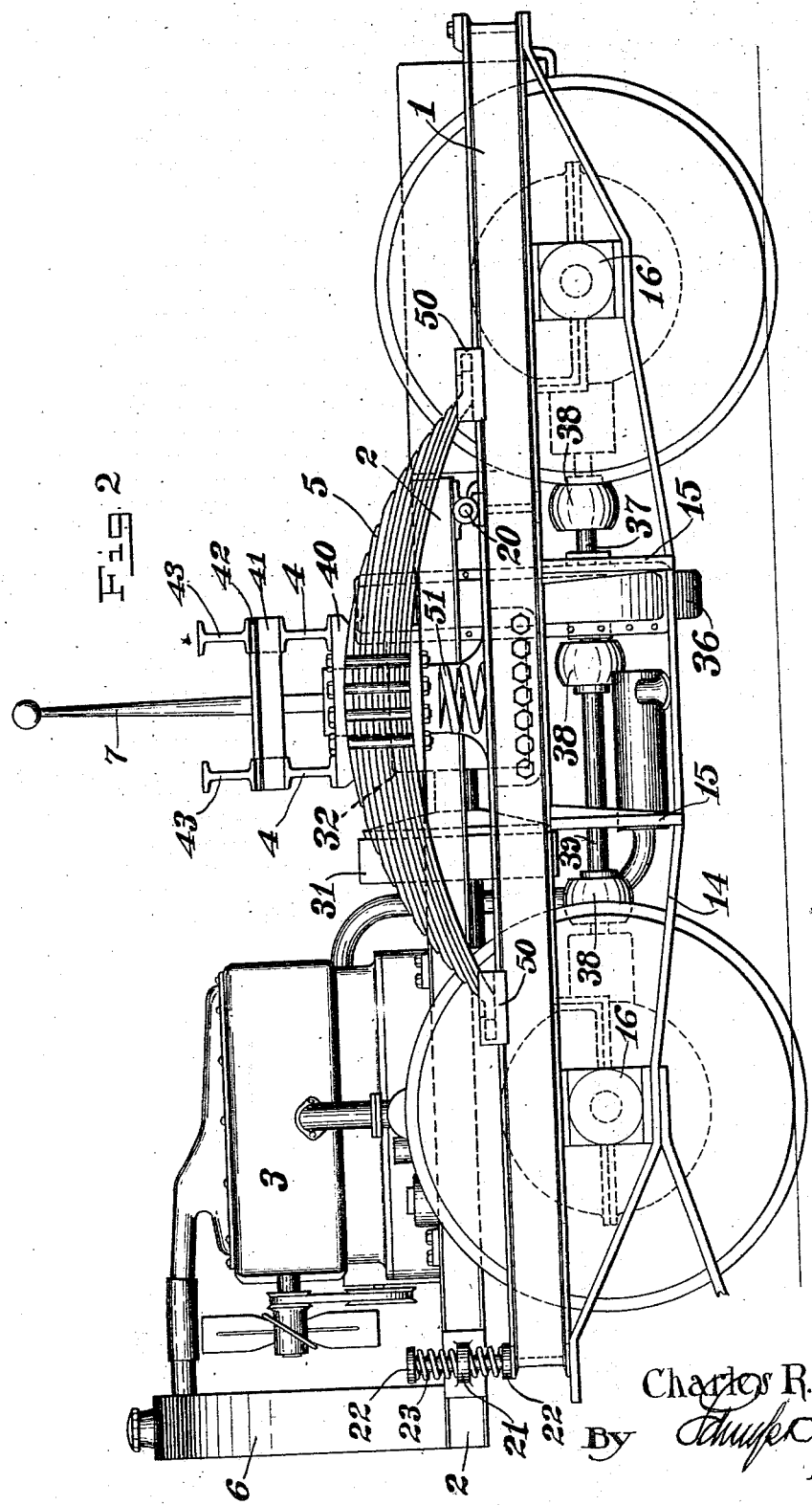
Fig. 2 is a side elevation of the same construction and parts.
Figure 3:
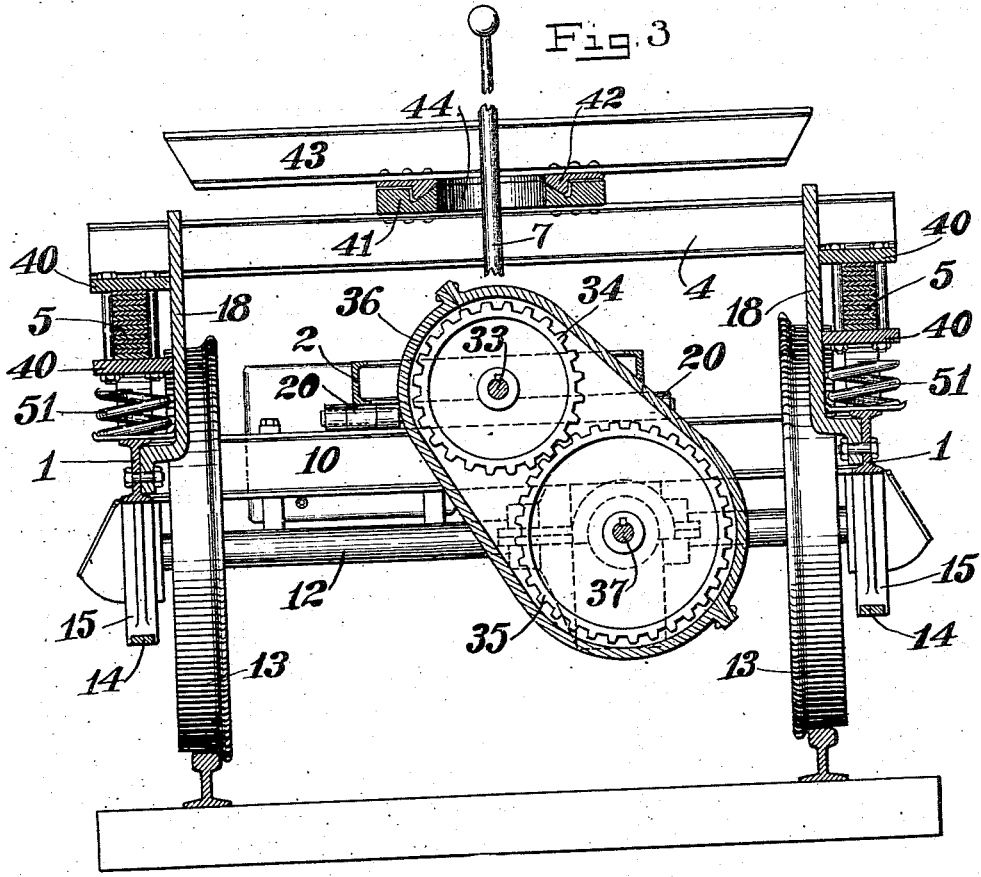
Fig. 3 is a transverse sectional elevation with the plane of section approximately through the center of the truck.
Figure 4:
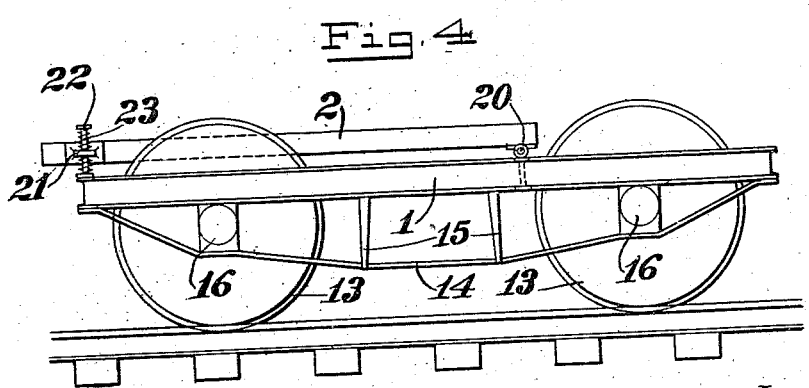
Fig. 4 is a side elevation of certain portions of the truck frame with other parts removed, to thereby more clearly show the relationship of certain parts.

In the operation of short branch lines of railroads and for other services wherein the runs are short, or the travel light, gasolene driven motor cars are frequently employed. It is for this and analogous service to which my invention is intended to be employed.

In carrying out this invention it has been my desire to mount the essential features of the power plant and the driving mechanisms upon a truck, so as to make the same in a large measure independent of the car body. It has particularly been my desire to have the motor or engine mounted upon a frame of its own, which frame is carried by the ordinary truck frame, and is spring-supported, whereby the vibrations of the motor will be largely absorbed by the springs and not communicated to the usual truck frame, and further, to mount the car body upon this truck through the medium of springs, and to keep the car body and the special frame which carries the motor, entirely disconnected, to thereby isolate the car body from the vibrations produced by the motor. The truck and the driving mechanisms shown in the drawings represent the type of construction which I now prefer. I will, therefore, describe this, it being understood that in many respects the details of construction might be modified without effecting the essential character of the invention.

The truck herein illustrated is a four-wheeled truck, having two axles 12, upon which wheels 13 are secured, this construction being essentially that employed in ordinary railroad work. The truck frame illustrated consists of two side bars 1 and two transverse end bars 10. In addition, a third transverse bar 11 is employed to serve as the immediate support for one end of the engine carrying frame. The side bars 1 of the truck frame are also shown as provided with bottom tension bars 14, connected at their ends with the ends of the bar 1, having struts or posts 15 interposed between the same and the bottom of the bar 1, and also having mounted thereon the boxes 16, in which the axles are journaled. The construction of the truck frame may be varied to suit conditions.

The engine 3 and the transmission and power controlling mechanisms are mounted upon a frame which comprises two side bars 2 hinged at one end by means of hinges 20 to the transverse bar 11 of the main truck frame. This frame has transverse bars 24 connecting the two side bars at such points as may be desired to properly brace it and to furnish support for the driving mechanism. The engine 3 may be any suitable type of internal combustion engine. I have shown the shaft 30 driven thereby, as being provided with a clutch 31 and with change gear box 32. These parts may be of any suitable and desired construction.

The end of the engine frame 2, opposite that which is hinged, is supported on springs as follows: The frame has a lug, or ear, 21, projecting from each side and centrally bored to receive a pin or bolt 22, which is fixed to the main truck frame. A helical spring 23 is placed, both above and below the ear 21, these springs acting to support this end of the engine frame, and also to prevent undue rising thereof when an upward throw is produced by inequalities in the road bed. Normally, the spring 22 which is below the ear 21, carries the load. The spring 23 which is above the ear 21, prevents undue rising of the engine frame, should it be given an upward throw by inequalities of the track. In this manner the vibrations produced by the operation of the engine are absorbed and are communicated in only a relatively small per cent., to the main truck frame.

The shaft 33, which forms a part of the transmission which is farthest removed from the engine, has mounted thereon a gear wheel 34, which meshes with the companion gear 35, mounted upon a shaft 37, which is journaled upon the main truck frame. It is evident that sprocket wheels and a chain may be used as a substitute drive.

The shaft 37, upon which the wheel 35 is secured, is a short section of a transmission mechanism which connects the two axles of the truck. This section is journaled in suitable bearings carried by the main truck frame. The gears 34 and 35 being placed adjacent to the hinge 20 connecting the main truck frame with the engine frame, the slight vibrations due to the rise and fall of the opposite end of the engine frame 2 will not have any serious effect in the transmission of power between the two wheels.

The section 37 of this transmission line between the truck axles is connected by means of universal couplings 38 with shafts extending to the axles, of which the shaft 39 forms a part. These other shafts at each end, carry a bevel pinion 19, which meshes with the bevel gear 17, carried by the axle. The type of mechanism employed for connecting the transmission shaft with the axle is, in a large measure, immaterial. I have illustrated the bevel gear drive as I believe the same to be one very suitable for this purpose.

This truck is provided with means for connecting therewith one end of the car and supporting the same, which means are entirely disconnected from the engine frame and the vibrations which are produced therein. The manner of accomplishing this consists of mounting an under bolster upon the truck, supporting this from the truck by springs, and in providing an upper bolster mounted to swing upon the lower bolster and to which the car body is secured.

Both bolsters are provided with an opening surrounding their pivot axis, through which pass the levers and rods which may be needed in order to control the engine and the transmission mechanism. The type of controlling means employed may be anything found suitable and have, therefore, not been illustrated. The bar 7 is shown as being symbolic of a member of such controlling mechanisms. A preferred type of construction consists in employing two I-beams 4 for the main part of the lower bolster. These I-beams are connected at their ends by plates 40, which plates are secured to semi-elliptical, or leaf springs 5, by bolts. These springs 5 have their ends secured to shoes 50, which are mounted to have a slight sliding movement lengthwise of the truck upon the side bars 1 thereof. As the spring is depressed, the ends thereof will tend to separate slightly. These ends are not fixed to the truck frame so rigidly but that they can move lengthwise thereof enough to accommodate this action. I may also provide a helically coiled spring 51, which is secured upon the truck frame immediately below the leaf spring 5, and which is designed to act as an additional check and support for the bolster, when unusual force is applied thereto.

At the center of the lower bolster a plate 41 is secured, this extending from one I-beam to the other and having a central opening 44 and also being provided with a circular groove on its upper surface adapted to form the swinging pivot between the truck and the car. The top bolster 43 is also composed of two I-beams suitably secured together. This has a plate 42 secured to its lower surface and provided with a circular projection, complemental to the groove in the plate 41 and constituting the other half of the pivot bearing between the car and the truck.

To prevent relative movement of the bolsters from front to rear of the truck, I have provided two arms 18 secured to the truck frame, one at each side thereof and projecting upward between the I-beams 4. The plates 40 may also be provided with a notch which forms a freely sliding fit against the edges of the bar 18 and thus form a free vertically movable guiding engagement therewith, which will permit the bolster rising and falling, but will prevent any relative movement of the bolster lengthwise of the truck. The draft effort between the truck and the car is also transmitted through the same means.

In Fig. 5 I have shown one type of car and the manner in which this would be mounted upon this motor truck. A truck of this sort is a motor which may be operated entirely independent of its serving as a support for any car. It may be used as a detached motor or engine for haulage purposes, or it may have a car of any type combined therewith in the manner indicated in Fig. 5.

This plan of construction possesses the advantage of mounting the motor upon a frame which is entirely independent of the car body and in such manner that the vibrations due to the operation of the engine are not transmitted to the car body. The result is a smooth and easy riding car, being in this respect much superior to any plan in which the engine is carried by the car body. It also possesses superior advantages in the flexibility of the device, it being possible to transfer the entire driving truck from one type of car to another in a comparatively short time.

What I claim as my invention is:

1. In a motor driven car, in combination, a truck, a truck frame, an internal combustion engine, means for yieldingly supporting the engine from the truck frame, means for yieldingly supporting a car body from the truck frame independently of the motor, a pivotal king-pin connection between the car body and the truck having an axial opening adapted to permit the passage of engine controlling means.

2. In a motor driven car, in combination, a truck having a frame, a reciprocating driving motor, a supplemental frame carrying said motor and yieldingly supported from the truck frame, a car body supporting bolster and means for yieldingly supporting this bolster from the truck frame independently of the motor carrying frame, a king-pin pivotal connection between the car and the truck frame having an axial opening adapted to permit the passage of motor controlling means.

3. The combination with a truck frame, a plurality of axles journaled therein, a driving shaft and means connecting it with said axles, said shaft comprising a section journaled in fixed position relative to the truck frame, separate sections having driving connection each with its respective axle and universal couplings between the shaft sections, a motor carrying frame having a hinged connection at one end with the truck frame, springs connecting the other end with the truck frame, an engine mounted upon the spring supported end of this frame, a motor actuated shaft journaled on this frame and transmission gearing connecting this shaft with the fixedly mounted shaft section of the truck frame.

4. In a motor driven car, in combination, a truck frame, wheels journaled upon said frame, driving connections between the wheels comprising a shaft section fixedly journaled on the truck frame, a motor carrying frame hingedly connected by one end to the truck frame, springs yieldingly supporting the other end of the motor frame from the truck frame, an engine mounted on this spring supported end of the motor frame, an engine driven shaft journaled on the motor frame and gears connecting this shaft with said shaft of the truck frame and located adjacent the hinged connection between the two frames.

5. In a motor driven car, in combination, a truck frame, wheels journaled upon said frame, driving connections between the wheels comprising a shaft section fixedly journaled on the truck frame, a motor carrying frame hingedly connected by one end to the truck frame, springs yieldingly supporting the other end of the motor frame from the truck frame, an engine mounted on this spring supported end of the motor frame, an engine driven shaft journaled on the motor frame and gears connecting this shaft with said shaft of the truck frame and located adjacent the hinged connection between the two frames, and means for yieldingly supporting a car from the truck frame independently of the motor frame.

6. In a motor driven car, in combination, a truck, an engine mounted on the truck, driving connections from the engine to the wheels of the truck, a car body, a pivotal king-pin connection between the car body and the truck having an axial opening adapted to permit the passage of engine controlling means.

7. In a motor driven car, in combination, a truck comprising a frame and wheels journaled thereon, a motor carrying frame having a yielding support from the truck frame, an engine carried by this motor frame, a car body having a yielding support upon the truck frame independent of the motor frame, a king-pin pivotal connection between the car and the truck frame having an axial opening adapted to permit the passage of motor controlling means.

8. In a car truck, in combination, a frame provided with spring supporting guides, a bolster having vertically guided engagement with the truck frame, leaf springs fixed to said bolster, and shoes carried by the ends of these springs and having sliding engagement with the guides carried by the truck frame.

9. In a car truck, in combination, a truck frame, a bolster, vertical guides between the bolster and the truck at each side of the truck, a leaf spring between each end of the bolster and the truck frame, and shoes carried by the ends of said springs and having a sliding engagement with the truck frame.

10. In a car truck, in combination, a frame containing a beam at each side, a bolster having two separated bars, a guide post at each side of the truck and fitting between said bars of the bolster, a leaf spring beneath each end of the bolster, and shoes carried by the ends of said springs and having sliding engagement with the side bars of the truck frame.

11. In a motor driven car, in combination, a truck comprising a frame and wheels having axles journaled thereon, driving means connecting said axles comprising a shaft extending between them, a motor frame having one end hingedly supported from the truck frame and spring supports for its other end, an engine carried upon the spring supported end of said motor frame, a transmission drive mounted upon said motor frame and containing suitable controlling mechanisms, and a drive connection from said transmission drive to the shaft connecting the wheel axles located beyond said controlling mechanisms from the engine and adjacent the hinged end of the motor frame.

CHARLES R. HARCUS.